(No Model.)

W. A. O. HEGEMAN.
APPARATUS FOR PURIFYING WATER AND OTHER FLUIDS.

No. 327,269. Patented Sept. 29, 1885.

WITNESSES

INVENTOR
W. A. Ogden Hegeman,
by R. G. Dyrenforth,
his Attorney

UNITED STATES PATENT OFFICE.

W. A. OGDEN HEGEMAN, OF NEW YORK, N. Y.

APPARATUS FOR PURIFYING WATER AND OTHER FLUIDS.

SPECIFICATION forming part of Letters Patent No. 327,269, dated September 29, 1885.

Application filed May 29, 1885. (No model.)

*To all whom it may concern:*

Be it known that I, W. A. OGDEN HEGEMAN, a citizen of the United States, residing at New York, in the county of New York and State of New York, have invented certain new and useful Improvements in Purifying Bodies of Water and other Fluids, of which the following is a specification, reference being had therein to the accompanying drawings.

The invention relates to the purification of bodies of water or other fluids.

The object is readily and at comparatively small cost to purify or defecate water or any other liquid or fluid standing or contained in any basin, pond, pool, tank, cistern, cesspool, or other receptacle or reservoir, and thus practically to cleanse, purify, and freshen it or such reservoir; and the invention consists in purifying a liquid or other fluid in its appropriate receptacle or reservoir without the necessity of permanently removing it or running it off and supplying its place with other liquid or fluid by a circulatory system in which the liquid is taken from its receptacle filtered or otherwise purified, and, if desired, aerated or charged and then returned, the operation to be repeated or to continue, if requisite, and the procedure resembling the circulatory function of the animal economy, the reservoir representing the veins; the instrumentality for withdrawing and returning the liquid representing the heart; the instrumentality for separating out the noxious matter representing the kidneys; the instrumentality for removing the noxious matter representing an excretory function; the purified liquid-duct to the reservoir representing the arteries, and the instrumentality for aeration of the liquid representing the lungs or gills and the capillaries.

Figure 1:
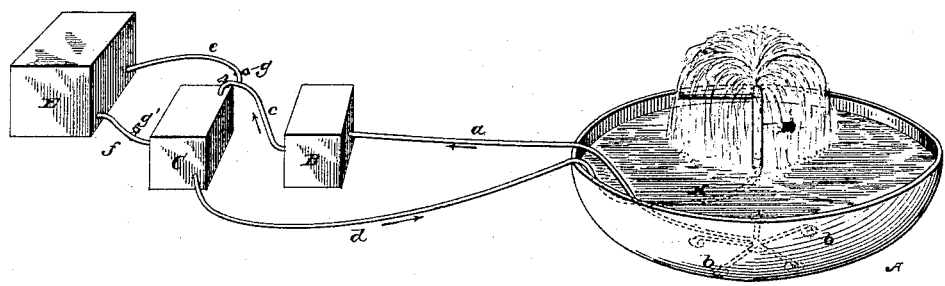
Figure 2:
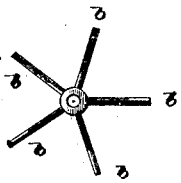
Figure 3:
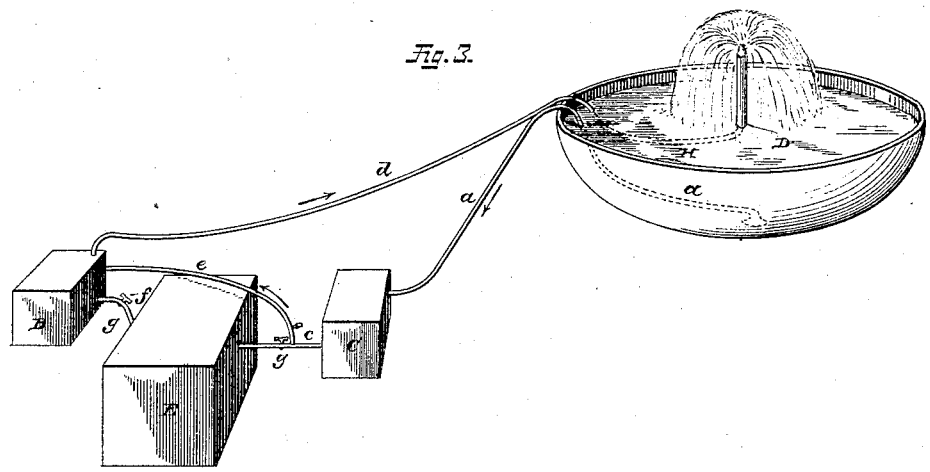

In the accompanying diagrams, Figure 1 is in general an elevation showing the circulatory apparatus upon a level with or above the surface of the reservoir. Fig. 2 is a plan view of the lower part of the suction-pipe. Fig. 3 is a view similar to Fig. 1, showing the circulatory apparatus below the reservoir.

The means which I show to illustrate a mode of carrying my invention into effect consist of an aggroupment of apparatus which may be portable and air-tight or not for removing and filtering the liquid, either mechanically or chemically, and redelivering it to the source whence it was taken, or discharging it elsewhere—as into another reservoir—to be purified, and, if desired, previous to its redelivery or discharge aerating the same by introduction of compressed air or gas in its transit from the pump to the discharge, or by spraying it or throwing it through the air in the form of a fountain or the like. To secure chemical as well as mechanical action in filtration, the filter may be heated or charged with steam chemical substances, antiseptic vapor, or the like.

The invention effects the thorough purification and cleansing of impure, polluted, or stagnant water or other foul fluid—such as sewage, oils, sugar-liquors, worts, beers in vats, gas, &c.

Referring to the diagrams, A represents a lake, pond, pool, reservoir, cistern, cesspool, tank, vat, or other receptacle, either natural or artificial, containing water or any liquid to be purified.

$a$ is a pipe or conduit, of any suitable material or shape, leading from the reservoir, preferably from its bottom, and, as shown in Fig. 1, to a pump, B. The mouth of the pipe $a$ may be of ordinary construction or be flaring, and may be provided with a suitable screen or strainer. It is preferred that the mouth of the suction-pipe should consist of several branches, $b$, capable of drawing sediment from any or all parts of the receptacle.

From the pump B a pipe, $c$, leads to the filter C, and from the filter a pipe or conduit, $d$, of any suitable shape or material, leads either immediately back into the reservoir or to a fountain or spraying device, D, of any desirable kind—as fixed or rotary. Instead of the fountain, there may be a compressor to inject air or suitable gas before discharge of the liquid and anywhere in the circulation between the induction and eduction ends. This forms a complete circulation, and would of itself suffice, it being understood that the filter C is of a construction to permit the removal of accumulated sedimentary matter, which may thereafter be employed for fertilizing purposes, or be treated and disinfected, according to another invention for which I intend to make application for a patent; but in some cases it is deemed desirable to employ an additional tank, E, which may serve as a settling-tank for the liquid, from which it is to be taken off into the filter; or the tank may receive the liquid as filtered and cleansed and serve to store it as long as desired. From the tank the liquid may be returned to the reservoir by the pump, by siphon, or otherwise.

The pipes leading to and from the tank E are marked $e\ f$, and, as before indicated, this tank may be entirely dispensed with, or may be cut out of the circulation by closing the cocks $g\ g'$.

It will be understood that when the tank E is used as a settling-tank means will be provided for removing sediment from time to time.

In the arrangement shown in Fig. 3, the filter is interposed between the tank and the pump. In this case the pump draws the water through the filter instead of forcing it through the same, as in the other example. The tank is shown as interposed between the filter and the pump. It will be seen that the tank may be readily cut out of the circulation by closing the cock $g$ in pipe $e$, or both this cock and the cock $g'$ in pipe $f$.

As illustrated diagrammatically in Fig. 1, the tank is arranged to act as a settling-tank—that is, as a tank to receive the water before it is filtered—while in Fig. 3 it is arranged as a storage-tank—that is, as a tank to receive the water after it is filtered; but it is obvious that the tank might also readily be arranged as a storage-tank in Fig. 1—for example, by connecting pipe $e$ with the discharge end of the filter, and pipe $f$ with pipe $d$, and likewise obvious that it might be arranged as a settling-tank in Fig. 3 by placing it between the pump and the reservoir in the line of pipe $d$, (cutting it out by pipe $e$, leading from the pump into pipe $d$, beyond the tank,) the pipes being provided with suitable cocks, and the filter and the pump being directly connected.

It will be apparent that by my procedure artificial lakes, basins, pools, tanks, or other receptacles in which water is confined may be kept pure and wholesome, without the necessity of flushing, or of having entirely to remove the water to scrape the bottom and supply the receptacle with fresh liquid.

In some cases it is desirable to locate my circulatory apparatus upon a boat or suitable float, it being understood that this presents convenient means for supporting the apparatus in larger bodies of water, and for adjusting the depth to which it may be desirable to dip the pipes.

The principle involved in my invention, and that which really constitutes its substance, is the removal of any foul fluid from its receptacle and returning it to the same purified, and it is clear, therefore, that removal of liquid, as by means of buckets or other instrumentalities, and the purification of the same and its return would fall within the scope of my invention, and it is also obvious that the liquid or other fluid need not be immediately returned.

Having thus fully described my invention, what I desire to claim and secure by Letters Patent, is—

1. In combination with a reservoir basin or cistern, an apparatus consisting of a pump or forcing or suction device, or suction or withdrawing device, an eduction-pipe, a suitable filter or cleansing apparatus, and an induction-pipe, substantially as set forth.

2. The circulatory apparatus, substantially as hereinbefore described, consisting of an eduction-pipe, $a$, a pump, B, a filter or cleansing apparatus, C, and a return pipe or conduit, $d$, connected and arranged as specified.

3. In combination with the pipe $a$, the pump B, the cleansing apparatus C, and the pipe $d$, suitably connected, the tank E, substantially as and for the purpose set forth.

4. In combination with the pipe $a$, the pump B, the cleansing apparatus C, the pipe $d$, and the tank E, the pipes $e\ f$, provided with suitable cocks, whereby the tank E may be cut out of circulation at pleasure, substantially as described.

5. In combination with a reservoir basin or cistern, the pipe $a$, the pump B, the cleansing apparatus C, the pipe $d$, and the tank E, suitably connected and arranged, for the purpose described.

6. The combination of an eduction-pipe, $a$, a pump, B, a filter or cleansing apparatus, C, a return pipe or conduit, $d$, and an aerating device, substantially as described.

In testimony whereof I affix my signature in presence of two witnesses.

W. A. OGDEN HEGEMAN.

Witnesses:
R. G. DYRENFORTH,
GREGOR MOETZEL.